COLOR PROJECTION SYSTEM

Filed May 7, 1964 5 Sheets-Sheet 1

INVENTORS:
WILLIAM E. GOOD,
MICHAEL GRASER, JR.
HENRY J. VANDERLAAN,
BY Julius J. Zaskalicky
THEIR ATTORNEY.

INVENTORS:
WILLIAM E. GOOD,
MICHAEL GRASER, JR.
HENRY J. VANDERLAAN,

BY Julius J. Zaskalicky
THEIR ATTORNEY

INVENTORS:
WILLIAM E. GOOD,
MICHAEL GRASER, JR.
HENRY J. VANDERLAAN,

BY Julius J. Zaskalicky
THEIR ATTORNEY.

COLOR PROJECTION SYSTEM

Filed May 7, 1964 5 Sheets-Sheet 4

INVENTORS:
WILLIAM E. GOOD,
MICHAEL GRASER, JR
HENRY J. VANDERLAAN,

BY Julius J. Zaskalicky
THEIR ATTORNEY.

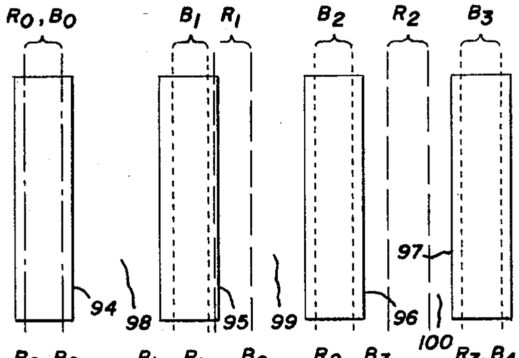

FIG. 9A.

POSITION OF DIFFRACTION ORDERS OF RED AND BLUE FORMED BY RED DIFFRACTION GRATING IN RELATION TO VERTICAL OUTPUT SLOTS AND BARS.

→ HORIZONTAL DISPLACEMENT

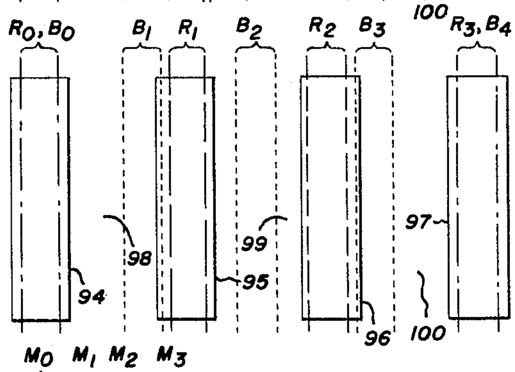

FIG. 9B.

POSITION OF DIFFRACTION ORDERS OF RED AND BLUE FORMED BY BLUE DIFFRACTION GRATING IN RELATION TO VERTICAL OUTPUT SLOTS AND BARS.

→ HORIZONTAL DISPLACEMENT

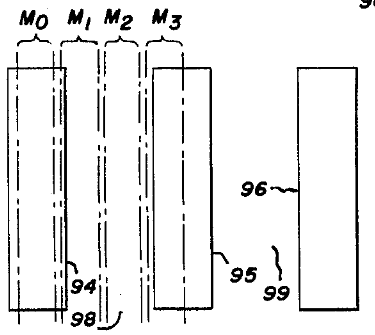

FIG. 9C.

POSITION OF DIFFRACTION ORDERS OF MAGENTA FORMED BY THE BEAT OR MAGENTA DIFFRACTION GRATING IN RELATION TO VERTICAL OUTPUT SLOTS AND BARS.

→ HORIZONTAL DISPLACEMENT

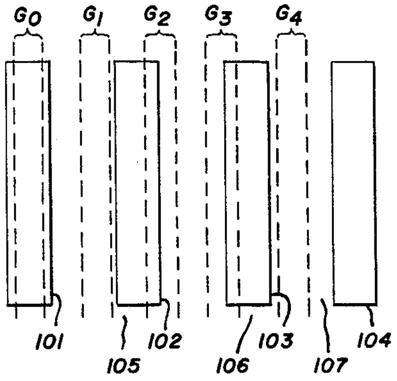

FIG. 9D.

POSITION OF DIFFRACTION ORDERS OF GREEN FORMED BY GREEN DIFFRACTION IN RELATION TO HORIZONTAL OUTPUT SLOTS AND BARS.

→ VERTICAL DISPLACEMENT

INVENTORS:
WILLIAM E. GOOD,
MICHAEL GRASER, JR.
HENRY J. VANDERLAAN,

BY Julius J. Zaskalesky
THEIR ATTORNEY.

3,290,436
Patented Dec. 6, 1966

3,290,436

COLOR PROJECTION SYSTEM

William E. Good, Liverpool, Michael Graser, Jr., Fayetteville, and Henry J. Vanderlaan, Liverpool, N.Y., assignors to General Electric Company, a corporation of New York Filed May 7, 1964, Ser. No. 365,751
5 Claims. (Cl. 178—5.4)

The present invention relates to improvements in systems for the projection of images of the kind including a light modulating medium formable into diffraction gratings by electron charge deposited thereon in accordance with electrical signals corresponding to the images.

In particular, the invention relates to the projection of color images using a common area of the light modulating medium and a common electron beam to produce deformations in the medium for simultaneously controlling the transmission therethrough point by point of the primary color components, in kind and intensity, in a beam of light in response to a plurality of simultaneously occurring electrical signals, each deformation corresponding point by point to the intensity of a respective primary color component of an image to be projected by such beam of light. Such systems provide a number of advantages over conventional systems in which the resultant light output is a small fraction of the limited energy available in an electron beam.

One such system for controlling the intensity of a beam of light includes a viscous light modulating medium which is adapted to deviate each portion of the beam in accordance with deformations in a respective point thereof on which the portion is incident, and a light mask having a plurality of apertures therein disposed to mask the beam of light in the absence of any deformation in the light modulating medium and to pass light in accordance with the deformations in said medium. The intensity of the portions of the beam of light deviated by the light modulating medium and passed through the apertures of the light mask varies in accordance with the magnitude of deformations produced in the light modulating medium.

The light modulating medium may be a thin light transmissive layer of oil in which the electron beam forms phase diffraction gratings having adjacent valleys spaced apart by a predetermined distance. Each portion of light incident on a respective small area or point of the medium is deviated in a direction orthogonal to the direction of the valleys. The intensity of the diviated light is a function of the depth of the valleys.

The phase diffraction grating may be formed in the layer of oil by the deposition thereon of electrical charges, for example, by a beam of electrons. The beam may be directed on the medium and deflected along the surface thereof in one direction at successively spaced intervals perpendicular or orthogonal to the one direction. Concurrently the rate of deflection in the one direction may be altered periodically at a frequency considerably higher than the frequency of scan to produce alterations in the electrical charges deposited on the medium along the direction of scan. The concentrations of electrical charge in corresponding parts of each line of scan form lines of electrical charge which are attracted to a suitably disposed oppositely charged transparent conducting plate on the other surface of the layer thereby producing a series of valleys therein. As the periodic variations in the period of scan are changed in amplitude, the depth of the valleys are correspondingly changed. Thus, with such a means each element of a beam of light impinging on one of the opposite surfaces of the layer is deflected orthogonally to the direction of the valleys or lines therein by an amount determined by the spacing between adjacent valleys, and the intensity of an element of deflected light is a function of the depth of such valleys.

When a beam of white light, which constituted of primary color components of light, is directed on a diffraction grating, light impinging therefrom is dispersed into a series of spectra on each side of a line representing the direction or path of undeviated light. The first pair of spectra on each side of the undeviated path of light is referred to as first order diffraction pattern. The next pair of spectra on each side of the undiffracted path is referred to as second order diffraction pattern, and so on. In each order of the complete spectrum the blue light is deviated the least, and the red light the most. The angle of deviation of red light in the first order light pattern, for example, is that angle measured with reference to the undeviated path at which the ratio of the wavelength of red light to the line to line spacings of the grating is equal to the sine of the deviation angle. The angle of deviation of the red light in the second order pattern is that angle at which the ratio of twice the wavelength of red light to the line to line spacing of the grating is equal to the sine of the angle, and so on.

If the beam of light is oblong in shape, each of the spectra is constituted of color components which are oblong in shape. If the diffracted light is directed onto a mask having a wide transparent slot appropriately located on the mask, the light passed through the slots is essentially reconstituted white light, each portion of which is of an intensity corresponding to the depth of the valleys illuminated by such portion. Such a system as described would be suitable for the projection of television images in black and white. The line to line spacing of the grating formed in each part of the light modulating medium is the same and determines the deviation of light under conditions of modulation. The depth of the valleys formed in each part of the light modulating medium varies in accordance with the amplitude of the modulating signal and determines the intensity of light in each deviated portion of the beam.

Systems have been proposed for the projection of three primary colors by a common viscous light modulating medium in which light deviating deformations are produced therein by a common electron beam modulated in various ways to produce a set of three diffraction gratings on the common media, each corresponding to a respective primary color component. The line to line spacing of each of the diffraction gratings are different thus producing a different angle of deviation for each of the primary color components. The depth of the deformation is varied in accordance with a respective primary color signal to produce corresponding variations in the intensity of light passed by the color pencil. The apertures in a light output mask are of predetermined extent and at locations in order to selectively pass the primary color components of the diffraction spectrum. The line to line spacing of each of the three primary diffraction gratings determines the width and location of the cooperating slot to pass the respective primary color component when a diffraction grating corresponding to that color component is formed in the light modulating medium.

In the kind of system under consideration an electron beam is modulated by a plurality of carrier waves of fixed and different frequency each corresponding to a respective color component, the amplitude of each of which is modulated in accordance with an electrical signal corresponding to the intensity of the respective color component to form a plurality of diffraction gratings having valleys extending in the same direction, each grating having a different line to line spacing corresponding to a respective primary color component and the valleys thereof having an amplitude varying in accordance with the intensity of a respective primary color component. If the primary color components selected are blue, green and red, and the carrier frequency associated with each of these colors is proportionately lower, the deviation in the first order spectrum of the blue component of white light by the blue diffraction grating, and similarly the deviation of the green component by the green diffraction grating, and the deviation of the red component by the red diffraction grating, can be made to correspond quite closely. Accordingly, a pair of transparent slots placed in the light mask in position, relative to the undeviated path of light, corresponding to that deviation and of just sufficient orthogonal extent, pass all of the primary components. The intensity of each of the primary color components in the beam of light emerging from the mask would vary in accordance with the amplitude of a respective electrical signal corresponding to the respective color component. Projection of such a beam reconstitutes in color the image corresponding to the electrical signals.

When three diffraction gratings are formed simultaneously on a common area of the light modulating medium each having lines extending in the same direction, beat gratings are produced which have an adverse effect on the efficiencies of the color channels of the system and also upon the purity of primary color light passed by each of the channels whereby the reproduction of the color image is deleteriously affected. Such problems are partly resolved in a system in which one of the diffraction gratings has lines orthogonal to the direction of the lines of the other two diffraction gratings. Such a system is described and claimed in U.S. Patent 3,078,338, W. E. Glenn, Jr., assigned to the assignee of the present invention. The problem of the adverse effects of beats is now simplified in that only two primary gratings have lines extending in the same direction. Such problem is resolved by appropriate arrangement of the elements of the system and their mode of operation as more fully described and claimed in a copending application Serial No. 343,990, filed February 11, 1964, and assigned to the assignee of the present invention.

Preferably, in the latter described system the one grating lines correspond in direction to the direction of horizontal scan, and the line to line spacing correspond to the line to line spacing in a field of scan. Of course, the lines of the other diffraction gratings would be perpendicular or orthogonal to the lines of the one grating. In such a system it has been found advantageous to form the gratings corresponding to the red and blue primary color components with lines orthogonal to the direction of horizontal scan, and to utilize the grating formed by the lines of horizontal scan for control of the green color component in the image. While the above described arrangements in a simultaneous superimposed grating system improve the light efficiency of the system and also avoid color contamination, in the various color channels thereof, additional efficiency is desired.

Increased efficiency is obtained by providing in the light input channel of such a system a pair of lenticulated plates. One plate includes an array of spherical lenticules, each of which serve to image a source of light on a respective portion of a slot on the input mask of the system. The other plate also includes an array of spherical lenticules, each of which serves to image a respective one of the lenticules on the first mentioned plate onto the raster area of the light diffracting medium. With such an arrangement light from a small source is formed into a plurality of secondary sources each located in one of the slots. The input bar and slot arrays of the input light mask are preferably located close to the second lenticular plate. The lenticular plates are preferably sectors of concentric spherical shells, the center of which is the center of the raster area of the light diffracting medium. By proportioning the spacing of the horizontal slots of one array with respect to the spacing of the vertical slots of the other array in accordance with the aspect ratio of raster area, and similarly proportioning the horizontal and lateral dimensions of each of the lenticules on each of the lenticular plates, the high efficiency and uniformity of illumination of the raster area is obtained for color projection. Correspondingly, the output mask is arranged to have a relatively large portion of the active surface area thereof open to pass light under the appropriate conditions. Such improvements are more fully described and claimed in a copending application Serial No. 316,606, filed October 16, 1963, and assigned to the assignee of the present invention. However, even with such additional arrangements, additional efficiency is desired to reduce power consumption and size of the light source, for example.

In one of its aspects the present invention is directed to providing an improvement in such a system as described which enable not only the utilization of wider openings in the input mask of such systems, to allow maximum light to pass through, but also to make more extensive use of openings in the output mask to allow more of the diffracted light from the light modulating medium to pass therethrough to the screen under appropriate conditions of modulation without introducing undesired contamination in the various color channels of the system.

In accordance with one aspect of the present invention, the ratio of the line to line spacings of the blue diffraction grating to the red diffraction grating is selected equal to the ratio of the dominant red and to the dominant blue wavelength utilized in the three primary color additive system. Such an arrangement enables the instantaneous light efficiency of the diffracted gratings, as well as the average light efficiency to be improved. The center to center spacing of the slots, the number of slots utilized with a single individual source from the many sources passing light through the input light mask are arranged such that essentially all of the significant order of red and blue diffracted light for the depth of modulation used are passed therethrough without impairment.

In light valve projection utilizing phase diffraction gratings such as utilized in the present invention, in the absence of any deformation, 100% of the light appears in the zero order, i.e., as undiffracted light. When the light modulation medium is deformed by an electron beam so as to form a phase diffraction grating therein of essentially sinusoidal contour, light energy appears in the first, second and higher diffraction orders. The first diffraction order can contain approximately a maximum of 67% of the total light depending on the depth of deformation. With deeper deformation the percentage of light appearing in the second diffraction order increases and reaches a maximum at approximately 47%. With still deeper deformation the percentage of light in the third order increases and reaches a maximum at approximately 38%. The maximum instantaneous efficiency for just the first order of diffracted light is 67%. The maximum instantaneous efficiency for the first and second orders of diffracted light is 93%. For first and third orders maximum instantaneous efficiency is 69%. For the first, second, and third orders the maximum instantaneous efficiency is 98%. Thus it is seen that orders of light higher than third order can be neglected without sacrifice of light efficiency in phase diffraction gratings. The average light efficiency of the grating is somewhat less as the gratings decay over the period of a field.

In accordance with the present invention at least the first and second orders, and in the case of one of the colors the first three orders of diffracted light are utilized thereby enabling very high efficiency in the light modulating medium to be obtained.

The novel features believed characteristic of the invention are set forth in the appended claims. The invention itself, together with further objects and advantages thereof, may best be understood by reference to the following description taken in connection with the accompanying drawings in which:

FIGURE 9A shows a diagram of a portion of the central section, including the vertical slots and bars, of the output mask of FIGURE 5 on which are superimposed various blocks representing various diffractions orders of two of the primary color components of light for the longer wavelength or red grating.

FIGURE 9B shows a diagram similar to the diagram of FIGURE 9A for the grating utilized for controlling the shorter wavelength or blue primary color component.

FIGURE 9C shows a diagram similar to the diagrams of FIGURES 9A and 9B showing the manner in which the beat grating formed in the light modulating medium by the beating of the red and blue grating diffracts the magenta light.

FIGURE 9D shows a diagram of a portion of a side section including the horizontal slots and bars of the output mask of FIGURE 5 on which is superimposed various blocks representing various diffraction orders of the green primary color component by the green grating.

Figure 1:
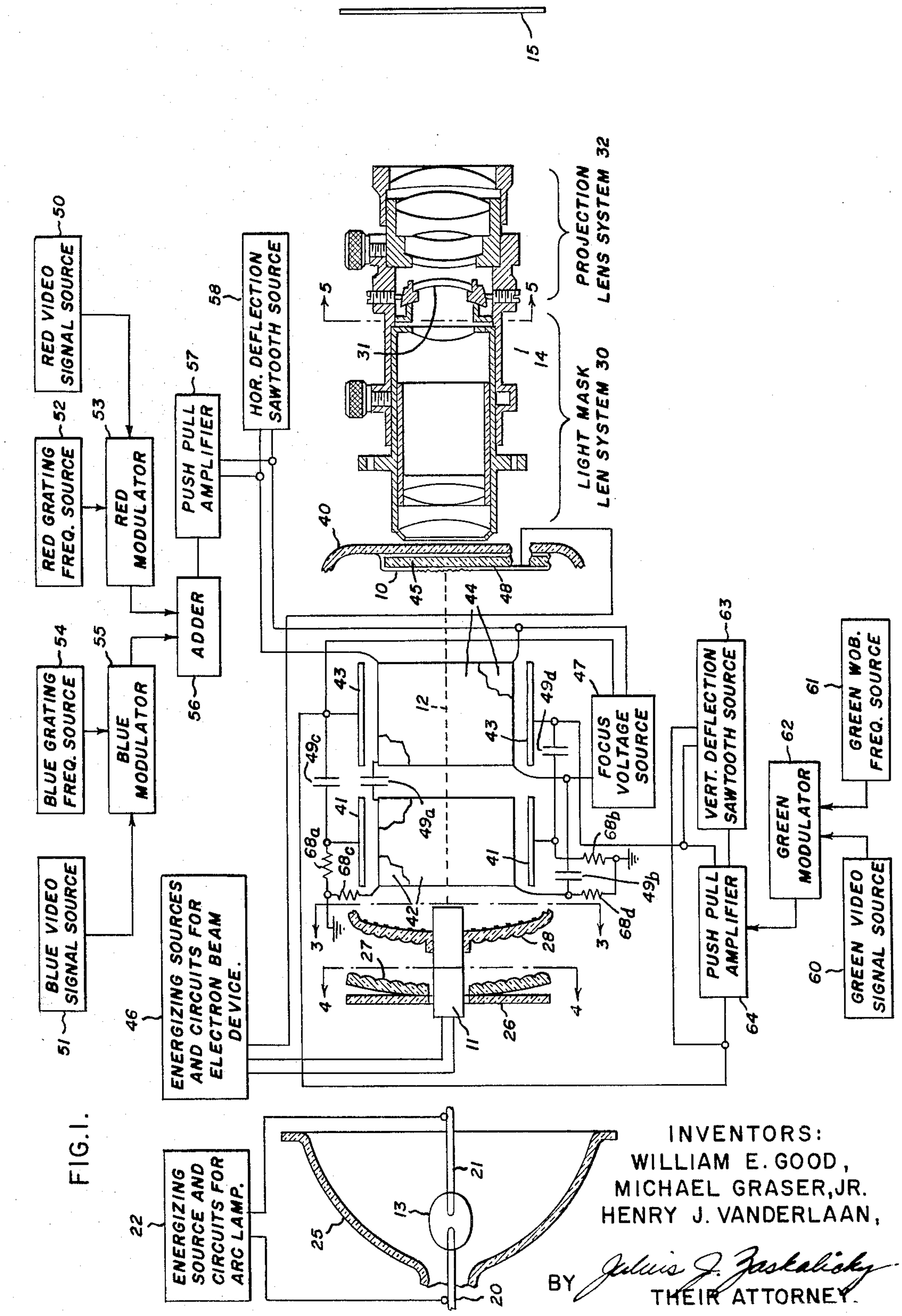
FIGURE 1 is a schematic diagram of the optical and electrical elements of a system useful in explaining the present invention.

Referring now to FIGURE 1 there is shown a simultaneous color projection system comprising an optical channel including a light modulating medium 10, and an electrical channel including an electron beam device 11, the electron beam 12 of which is coupled to the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity of each of the three primary color constituents of an image to be projected are applied to the electron beam device 11 to modulate the beam thereof in the manner to be more fully described below, to produce deformations in the light modulating medium which modify the light transmitted by the modulating medium in point by point correspondence with the image to be projected. An apertured light mask and projection lens system 14, which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of a voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in a horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. With the arrangement described efficient utilization is made of light from the source, and also uniform distribution of light is produced on the light modulating medium. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, an output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 31, and is projected by the projection lens system 32 onto the screen 15. The details of the light input optics of the light valve projection system shown in FIGURE 1 are described in the aforementioned copending patent application Serial No. 316,606, filed October 16, 1963, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Serial No. 336,505, filed January 8, 1964, and assigned to the assignee of the present invention.

According to present day color television standards in force in the United States an image to be projected by a television system is scanned by a light-to-electrical converter horizontally once every $\frac{1}{15735}$ of a second, and vertically at a rate of one field of alternate lines every one-sixtieth of a second. Correspondingly, an electron beam of a light producing or controlling device is caused to move at a horizontal scan frequency of 15,735 cycles per second in synchronism the scanning of the light converter, and to form thereby images of light varying in intensity in accordance with the brightness of the image to be projected. The pattern of scanning lines, as well as the area of scan, is commonly referred to as the raster.

Figure 2A:
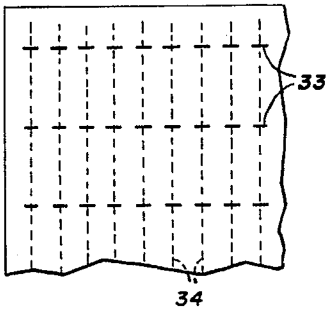
FIGURE 2 is a diagrammatic representation of the active area of the light modulating medium showing the horizontal scan lines and the location of charge with respect thereto for the various primary color channels of the system.
Figure 2B:
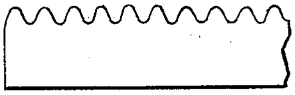

In FIGURE 2A is shown in schematic form a portion of such a raster in the light modulating medium along with the diffraction grating corresponding to the red color component. The size of the raster or whole area scanned in the embodiment is approximately 0.82 of an inch in height, and 1.10 inches in width. The horizontal dash lines 33 are the alternate scanning lines of the raster appearing in one of the two fields of a frame. The spaced vertically oriented dotted lines 34 on each of the raster lines, i.e., extending across the raster lines schematically represent concentrations of charge laid down by an electron beam to form the red diffraction grating in a manner to be described hereinafter, such concentrations occurring at equally spaced intervals on each line, corresponding parts of each scanning line having similar concentrations thereby forming a series of lines of charge equally spaced from adjacent lines which cause the formation of valleys in the light modulating medium, the depth of such valleys, of course, depending upon the concentration of charge. Such a wave is produced by a signal superimposed on an electron beam moving horizontally at a frequency 15735 cycles per second, a carrier wave, of smaller amplitude but of fixed frequency of the order of 16 megacycles per second thereby producing a line-to-line spacing in the grating of approximately $\frac{1}{760}$ of an inch. The high frequency carrier wave causes a velocity modulation of the beam thereby causing the beam to move in steps, and hence to lay down the pattern of charge schematically depicted in this figure with each valley extending in the vertical direction and adjacent valleys being spaced apart by a distance determined by the carrier frequency as shown in greater detail in FIGURE 2B which is a side view of FIGURE 2A.

Figure 2C:
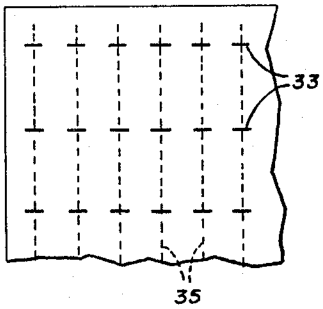
Figure 2D:
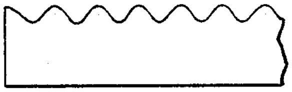

In FIGURE 2C is shown a section of the raster on which a blue diffraction grating has been formed. As in the case of the red diffraction grating, the vertically oriented dotted lines 35 of each of the electron beam scan lines 33 represent concentrations of charge laid down by the electron beam. The grating line to line spacing is uniform, and the amplitude thereof varies in accordance with the amount of charge present. The blue grating is formed in a manner similar to the manner of formation of the red grating, i.e., a carrier frequency of amplitude smaller than the horizontal deflection wave is applied to produce a velocity modulating in the horizontal direction of the electron beam, at that frequency rate, thereby to lay down charges on each line that are uniformly spaced with the line to line spacing being a function of the frequency. A suitable frequency is nominally 12 megacycles per second. In FIGURE 2D is shown a side view of the section of the light modulating medium showing the deformations produced in the medium in response to the aforementioned lines of charge.

Figure 2E:
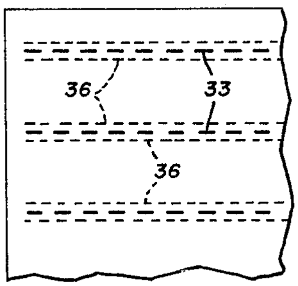
Figure 2F:
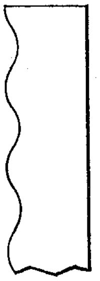

In FIGURE 2E is shown a section of the raster of the light modulating medium on which the green diffraction grating has been formed. In this figure are shown the alternate scanning lines 33 of a frame or adjacent lines of a field. On each side of the scanning lines are shown dotted lines 36 schematically representing concentrations of charge extending in the direction of the scanning lines to form a diffraction grating having lines or valleys extending in the horizontal direction. The green diffraction grating is controlled by modulating the electron scanning beam at very high frequency, nominally 48 megacycles in the vertical direction, i.e., perpendicular to the direction of the lines, to produce a uniform spreading out or smearing of the charge transverse to the scanning direction of the beam, the amplitude of the smear in such direction varying proportionately with the amplitude of the high frequency carrier signal, which amplitude varies inversely with the amplitude of the green video signal. The frequency chosen is higher than either the red or blue carrier frequency to avoid the undesired interaction with signals of other frequencies of the system including the video signals and the red and blue carrier waves, as will be more fully explained below. With low modulation of the carrier wave more charge is concentrated in a line along the center of the scanning direction than with high modulation thereby producing a greater deformation in the light modulating medium at that part of the line. In short, the natural grating formed by the focussed beam represents maximum green modulation or light field, and the defocussing by the high frequency modulation deteriorates or smears such grating in accordance with the amplitude of such modulation. For good dark field the grating is virtually wiped out. FIGURE 2F is a sectional view of the light modulating medium of FIGURE 2E showing the manner in which the concentrations of charge along the adjacent lines of a field function to deform the light modulating medium into a series of valleys and peaks representing a phase diffraction grating.

Thus FIGURE 2 depicts the manner in which a single electron beam scanning the raster area in the horizontal direction at spaced vertical intervals may be simultaneously modulated in velocity in the horizontal direction by two amplitude modulated carrier waves, both substantially higher in frequency than the scanning frequency, one substantially higher than the other, to produce a pair of superimposed vertically extending phase diffraction gratings of fixed spacing thereon, and also may be modulated in the vertical direction by an amplitude modulated carrier wave to produce a third grating having lines of fixed line to line spacing extending in the horizontal direction orthogonal to the direction of grating lines of the other two gratings. By amplitude modulating the three beam modulating signals corresponding point by point variations in the depth of the valleys or lines of the diffraction grating are produced. Thus by applying the three signals indicated, each simultaneously varying in amplitude in accordance with the intensities of a respective primary color component of the image to be projected, three primary diffraction gratings are formed, the point by point amplitude of which vary with the intensity of a respective color component.

As used in this specification with reference to the specific raster area of the light modulating medium, a point represents an area of the order of several square mils and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in general a system such as the kind under consideration herein that one grating line is adequate to function for proper control of the luminance characteristic of a picture element in the projected image and that about three to four lines are a minimum for the proper control of hue and saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of a grating controls the deviation, and hence color component selection, and the amplitude of the grating controls the intensity of such component. By the selection of the spacing of the blue and red grating, in a red, blue, and green primary system, for example, such that the spacing of the blue grating is sufficiently smaller in magnitude than the red grating so as to produce the same deviation in first order light as the deviation of the red component by the red grating, the deviation of the red and blue components can be made the same. Thus the red and blue components can be passed through the same apertures in an output mask and the relative magnitude of the red and blue light would vary in accordance with the amplitude of the gratings. Such a system is described and claimed in U.S. Patent No. Re. 25,169, W. E. Glenn, Jr., assigned to the same assignee as the present invention.

When a pair of phase diffraction gratings such as those described are simultaneously formed and superimposed in a light modulating medium, inherently another diffraction grating, referred to as the beat frequency grating, is formed which has a spacing greater than either of the other two gratings, if the beat frequency itself is lower than the frequency of either of the other two gratings. The effect of such a grating, as is apparent from the considerations outlined above, is to deviate red and blue light incident thereon less than is deviated by the other two gratings and hence such light is blocked by the output mask having apertures set up on the basis of considerations outlined in the previous paragraph. Such blockage represents impairment of proper color rendition as well as loss of use-pairment of proper color rendition as well as loss of useful light. One way to avoid such effects in a two color component system is to provide diffraction gratings which have lines or valleys extending orthogonal to one another. Such an arrangement is disclosed and claimed in U.S. Patent 3,078,338, W. E. Glenn, Jr., assigned to the assignee of the present invention. However, when it is desired to provide three diffraction gratings superimposed on a light modulating medium for the purpose of modulating simultaneously point by point the relative intensity of each of three primary color components in a beam of light, inevitably two of the phase gratings must be formed in a manner to have lines or valleys, or components thereof, extending in the same direction. The manner in which such effects can be avoided are described and claimed in the aforementioned copending patent aplication Serial No. 343,990, filed February 11, 1964, and assigned to the assignee of the present invention.

Referring again to FIGURE 1, an electron writing system is provided for producing the phase diffraction gratings in the light modulating medium, and comprises an evacuated enclosure 40 in which are included an electron beam device 11 having a cathode (not shown), a control electrode (not shown), and a first anode (not shown), a pair of vertical deflection plates 41, a pair of horizontal deflection plates 42, a set of vertical focus and deflection electrodes 43, a set of horizontal focus and deflection electrodes 44, and the light modulating medium 10. The cathode, control electrode, and first anode along with the transparent target electrode 48 supporting the light modulating medium 10 are energized from a source 46 to produce in the evacuated enclosure an electron beam that at the point of focussing on the light modulating medium is of small dimensions (of the order of a mil), and of low current (a few micro-amperes), and high voltage. Electrodes 41 and 42, connected to ground through respective high impedances 68*a*, 68*b*, 68*c* and 68*d* provide a deflection and focus function, but are less sensitive to applied deflection voltages than electrodes 43 and 44. The electrodes 43 and 44 control both the focus and deflection of the electron beam in the light modulating medium in a manner to be more fully explained below.

A pair of carrier waves which produce the red and blue gratings, in addition to the horizontal deflection voltage are applied to the horizontal deflection plates 42. The electron beam, as previously mentioned, is deflected in steps separated by distances in the light modulating medium which are a function of the grating spacing of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 to spread the beam out in accordance with the amplitude of the green video signal as explained above. The light modulating medium 10 is an oil of appropriate viscosity and of deformation decay characteristics on a transparent support member 45 coated with a transparent conductive layer adjacent the oil such as indium oxide. The electrical conductivity and viscosity of the light modulating medium is so constituted so that the amplitude of the diffraction gratings decay to a small value after each field of scan thereby permitting alternate variations in amplitude of the diffraction grating at the sixty cycle per second field scanning rate. The viscosity and other properties of the light modulating medium are selected such that the deposited charges produce the desired deformations in the surface. The conductive layer is maintained at ground potential and constitutes the target electrode for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks the source of the horizontal deflection and beam modulating voltages which are applied to the horizontal deflection plates to produce the desired horizontal deflection. This portion of the system comprises a source of red video signal 50, and a source of blue video signal 51 each corresponding, respectively, to the intensity of the respective primary color component in a television image to be projected. The red video signal from the source 50 and a carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplifier 57 is applied to the horizontal plates 44. The output of horizontal deflection sawtooth source 58 is also applied to plates 44 and to plates 42 through capacitors 49*a* and 49*b*.

Below the evacuated enclosure 40 are shown in block form the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. An output wave is obtained from the modulator having a carrier frequency equal to the carrier frequency of the green grating frequency source and an amplitude varying inversely with the amplitude of the green video signal. The modulated carrier wave and the output from the vertical deflection source 63 are applied to a conventional push-pull amplifier 64, the output of which is applied to vertical plates 43 to produce deflection of the electron beam in the manner previously indicated. The output of vertical deflection sawtooth source 63 is also applied to plates 43 and to plates 41 through capacitors 49*c* and 49*d*.

A circuit for accomplishing the deflection and focusing functions described above in conjunction with deflection and focusing electrode system comprising two sets of four electrodes such as shown in FIGURE 1 is shown and described in a copending patent application Serial No. 335,117, filed January 2, 1964, and assigned to the assignee of the present invention. An alternative electrode system and associated circuit for accomplishing the deflection and focusing function is described in the aforementioned copending patent application Serial No. 343,990.

As mentioned above the red and blue channels make use of the vertical slots and bars and the green channel makes use of the horizontal slots and bars. The width of the slots and bars, in one arrangement or array is one set of values and the width of the slots and bars in the other arrangement is another set of values. The raster area of the modulating medium may be rectangular in shape and has a ratio of height to width or aspect ratio of three to four in accordance with television standards in force in the United States. The center-to-center spacing of slots in the horizontal array is made three-fourths the center-to-center spacing of the slots in the vertical array. Each of the lenticules in each of the lenticular plates are also so proportioned, i.e., with height to width ratio of three to four. The lenticules in each plate are stacked into horizontal rows and vertical columns. Each of the lenticules in one plate are of one focal length and each of the lenticules on the other plate are of another focal length. The filter element may be constituted to have three sections registering light of red and blue color components in the central portion of the input mask and green light in the side sector portions as will be apparent from considering FIGURE 3.

Figure 3:
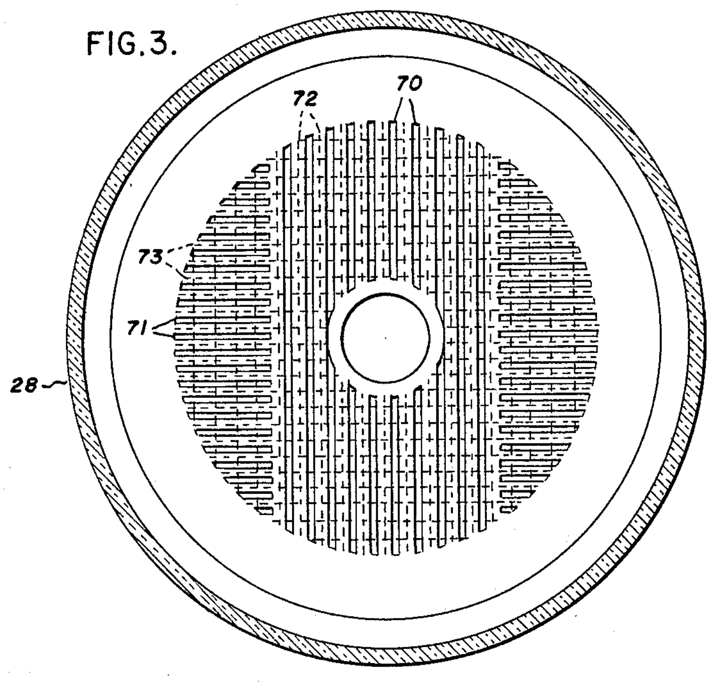
FIGURE 3 is an end view taken along section 3—3 of the system of FIGURE 1 showing the second lenticular lens plate and the input mask thereof.

In FIGURE 3 is shown a view of the face of the second lenticular lens plate and input mask 28 as seen from the raster area of the modulating medium or along section 3—3 of FIGURE 1. In this figure the vertical oriented slots 70 are utilized in the controlling of the red and blue light color components in the image to be projected. The horizontally extending slots 71 located in the sector area in the input mask on each side of the central portion thereof function to cooperate with the light modulating medium and light output mask to control the green color component in the image to be projected. The ratio of the center-to-center spacing of the horizontal slots 71 to the center-to-center spacing of the vertical slots 70 is three-fourths. The rectangular areas enclosed by the vertical and horizontal dash lines 72 and 73 are the boundaries for the individual lenticules appearing on the opposite face of the plate 28. The focal length of each of the lenticules is the same. The center of each of the lenticules lies in the center of an element of a corresponding slot.

Figures 4, 5:
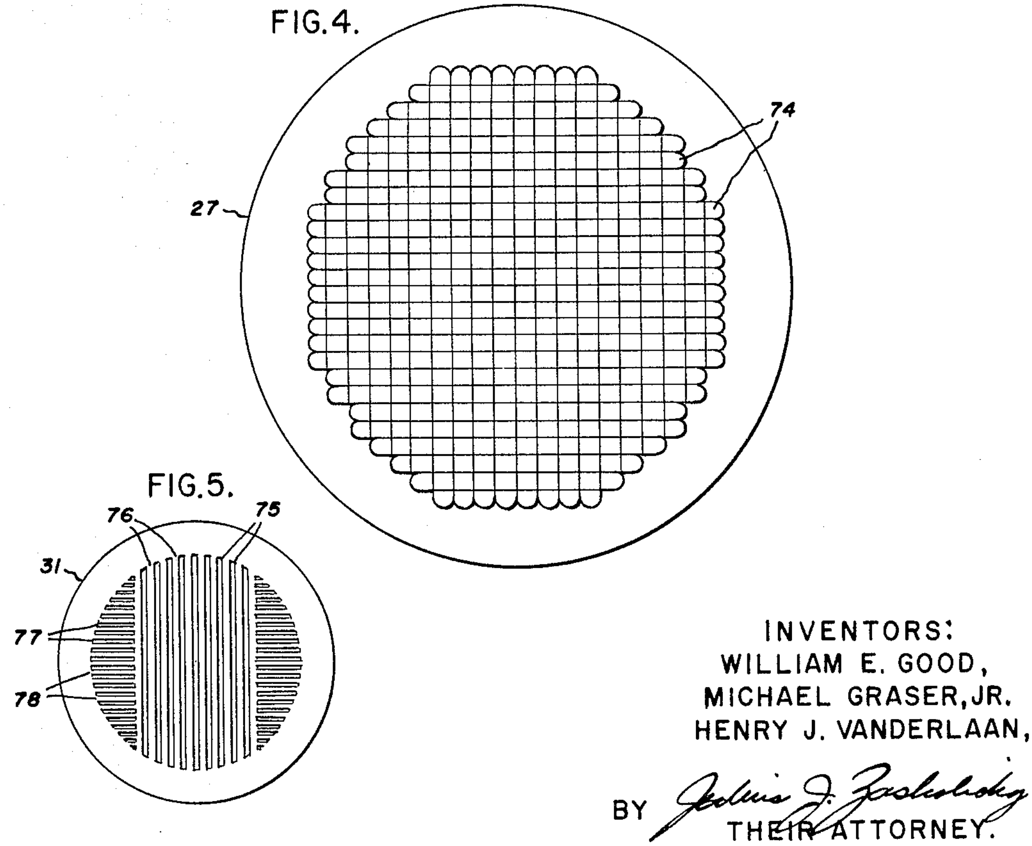
FIGURE 4 is an end view taken along section 4—4 of the system of FIGURE 1 showing the first lenticular lens plate thereof.
FIGURE 5 is an end view taken along section 5—5 of the system of FIGURE 1 showing the light output mask thereof.

FIGURE 4 shows the first lenticular lens plate 27 taken along section 4—4 of FIGURE 1 with horizontal rows and vertical columns of lenticules 74. Each of the lenticules of this plate cooperates with a correspondingly positioned lenticule on the second lenticular lens plate shown in FIGURE 3 in the manner described above. Each of the lenticules on plate 27 have the same focal length which is different from the focal length of the lenticules on the second lenticular plate 28.

FIGURE 5 shows the light output mask 31 of FIGURE 1 taken along section 5—5 thereof. This mask consists of a plurality of transparent slots 75 and opaque bars 76 in a central vertically extending section of the mask and a plurality of transparent slots 77 and opaque bars 78 in each of two sectors of the spherical mask lying on each side of the central portion thereof. As mentioned previously the slots and bars from the output mask are in a predetermined relationship to the slots and bars of the input mask.

Figure 6:
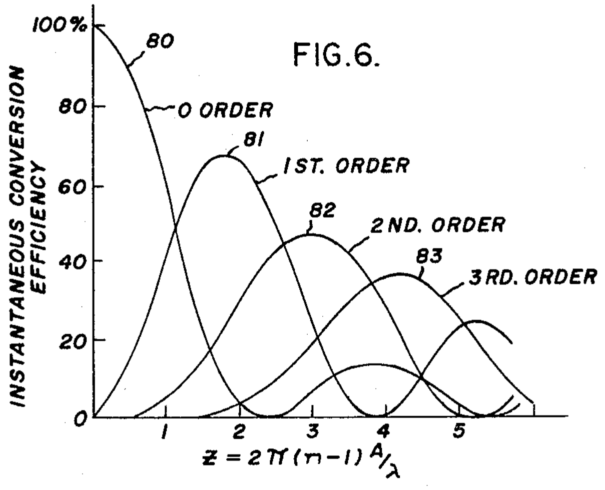
FIGURE 6 shows graphs of the instantaneous conversion efficiency of the light diffracting gratings formed in the light modulating medium as a function of the depth of modulation or deformation for various diffraction orders.

Referring now to FIGURE 6 there are shown graphs of the instantaneous conversion efficiency of the light diffracting grating formed in the light modulating medium as a function of the depth of modulation or deformation of the light modulating medium for various diffraction orders. In this figure instantaneous conversion efficiency for light directed on to the light modulating medium is plotted along the ordinate in percent and the deformation function Z, where $$Z=2\pi(n-1)A/\lambda$$

is plotted along the abscissa. In the above relationship A represents peak to peak amplitude or depth of deformation, $\lambda$ represents the wave length of light involved and $n$ represents the index of the light modulating medium. Graphs 80, 81, 82, and 83 show such relationships for the zero, the first, the second, and the third orders of diffracted light, respectively. In connection with this figure it is readily observed that when the light modulating medium is undeformed that all of the light is concentrated in the zero order which represents the undiffracted path of the light. Of course, the light passing through the light modulating medium would be deviated slightly by refraction of the light modulating medium as normally the index of refraction of the light modulating medium is different from the index of refraction of vacuum or air surrounding the medium, and is conveniently selected to be approximately in the range of refraction indices of the material of the various vitreous optical elements utilized in the system. The output mask is positioned in relationship to the input mask such that when the light modulating medium is undeformed the slots of the input mask are imaged on the bars of the output mask and thus the slight refraction effects that occur are allowed for. As the depth of modulation for a given grating is increased, progressively more light appears in the various diffraction orders higher than the zero order. Progressively as the peak efficiency of the first, second and higher orders of light is reached the value of the maximum efficiency of the higher order of light becomes progressively smaller. As can be readily seen from the graphs the maximum efficiencies of light in the first order, second and third orders is approximately 67 percent, 47 percent, and 37 percent, respectively.

Figure 7:
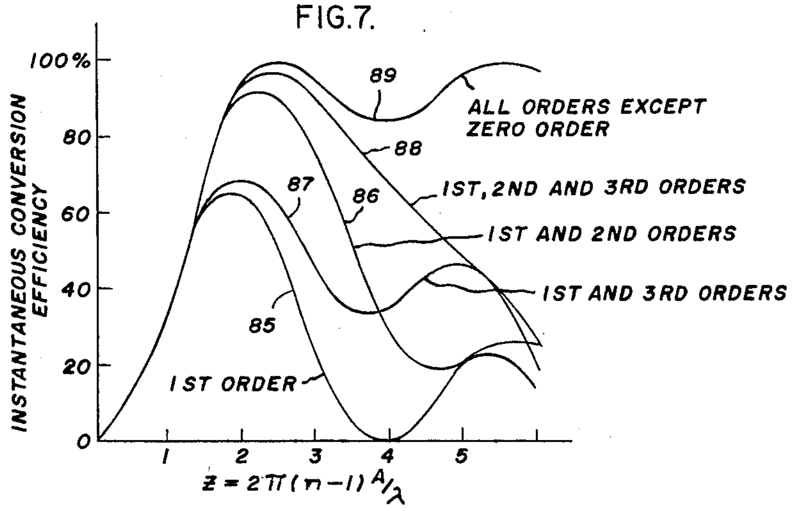
FIGURE 7 shows graphs of the instantaneous conversion efficiency of the light diffracting gratings formed in the light modulating medium as a function of the depth of modulation or deformation for various combinations of diffracted orders.

In FIGURE 7 are shown graphs of the instantaneous conversion efficiency versus Z, the function of the depth of modulation set forth above, for various combinations of diffraction orders. In this figure instantaneous conversion efficiency is plotted in percent along the ordinate, and the parameter Z is plotted along the abscissa. Graph 85 shows the manner in which the instantaneous conversion efficiency of the first order increases when the depth of modulation reaches a peak at approximately 67 percent and thereafter declines. Graph 86 shows the manner in which the instantaneous conversion efficiency for the sum of the first and second orders of diffracted light increases reaching a peak at approximately 93% and thereafter declines. Similarly, graph 87 shows the manner in which the instantaneous conversion efficiency of the diffraction grating varies for the sum of the first and third orders increases reaches a peak at approximately 69% and thereafter declines. Finally, graph 88 shows the manner in which the instantaneous conversion efficiency of the sum of the first, second and third orders of light increases to a peak of approximately 98% and thereafter declines. Graph 89 shows instantaneous conversion efficiency of the sum of all orders except the zero order.

Figure 8:
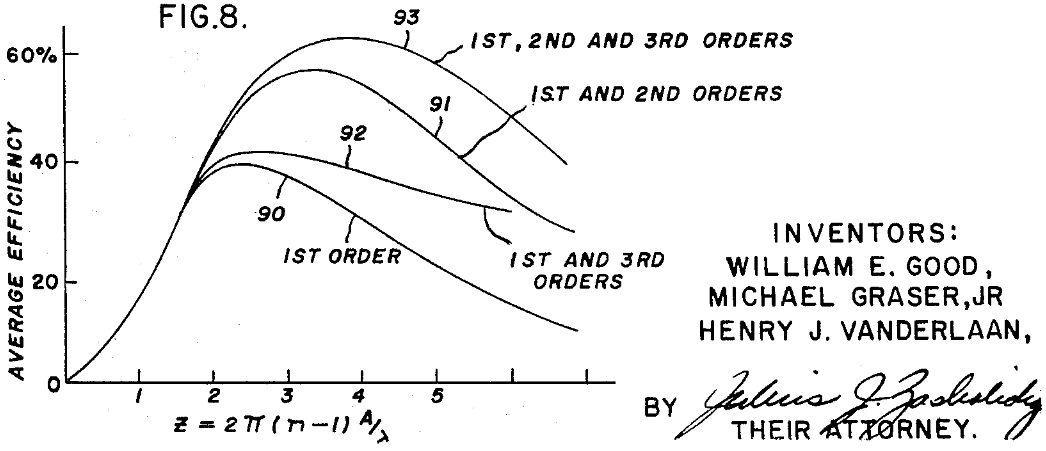
FIGURE 8 shows graphs of the average efficiency for linear decay of the light diffracting gratings formed in the light modulating medium as a function of the depth of modulation or deformation for various combinations of diffracted orders.

In FIGURE 8 are shown a group of graphs on the average conversion efficiency for the various combinations of diffraction orders as a function of the amplitude of deformation. The average conversion efficiency is represented in percent along the ordinate, and amplitude in terms of the aforementioned parameter Z is plotted along the abscissa. For the proper operation of the system of FIGURE 1 it is necessary for the light modulating medium to retain the diffraction deformations produced therein over a period comparable to the period of a scanning field. Ideally, each point of the light modulating medium should retain the deformation unattenuated until it is subject to a new deformation in response to the modulating signal. Practically, such an ideal situation cannot be met as the charge on the light modulating medium decays and thereby permits the diffraction patterns in the light modulating medium to decay. Under such practical conditions it is desirable for the deformations to decay to a small value over the period of a field of the television scanning process so that new deformation information can be applied to the light modulating medium. The average efficiency graphs of FIGURE 8 are based on the decay of the deformations to approximately one-third their initial value over the period of a field. Accordingly, even after the electron charge has been deposited by the electron beam to produce the deformation the existence of the deformation continues to diffract the light incident on the medium. Graphs 90, 91, 92, and 93 show, respectively the average efficiency of the first diffraction order, the sum of the first and second orders, the sum of the first and third orders, and the sum of the first, second and third orders.

Referring now to FIGURE 9A there is shown a portion of the bars and slots of the central section of the output mask 31 of FIGURES 1 and 5. Conveniently, four bars 94, 95, 96, and 97, and three slots 98, 99, and 100 are shown. More particularly, this figure illustrates where the various diffraction orders of red and blue light fall in relationship to the vertical bars and slots of the output mask. The horizontal coordinate of the diagram represents the horizontal displacement of the various orders of the red and blue primary colors in relationship to the slots and bars in the output mask. The color component is designated by an appropriate literal symbol, R for red, and B for blue. The diffraction is indicated by the appropriate numerical subscript. As mentioned above, the light from a particular slot in the input mask in the absence of modulation in the light modulating medium falls on a particular bar in the output mask. Such a condition is represented by the lines bracketed $B_0$, $R_0$, where the separation of such lines bears a definite relationship to the width of the slot source of member 28 of FIGURE 3. As the longer wavelengths of light are deviated more by a diffraction grating of fixed line to line spacing, the first order image of red light, $R_1$, is deviated more than the first order image of blue light, $B_1$, as shown in the figure. Also, the progressively higher orders of diffracted light are deviated progressively more by the factor of the order of that light. Thus the second order red component is deviated twice the amount of deviation of first order red component, and similarly the second order of blue light is deviated twice the amount of the first order of blue light, and so on. What has been said for the various primary color components is also true for the wavelengths in the primary color component, i.e., the long wavelengths of red light are deviated more than the short wavelengths of the red light, for example. Accordingly, the spacial spread of the image of the source is progressively greater for higher orders and also for longer wavelengths. Thus the source, which has a particular width in the zero order image, has progressively greater widths in the higher order images, the amount of increase depending not only on the order but also on the color component. The increased widths, for reasons of clarity, have not been shown in FIGURE 9A, and in FIGURES 9B, 9C, and 9D, as well.

The line to line spacing of the red diffraction grating, the line to line spacing of the blue diffraction grating, the nominal or central wavelength of red light, the nominal or central wavelength of blue light used in the system are particularly related in a manner to be more fully described below. By nominal or central wavelength of a primary color is meant a centrally chosen wavelength in the spectrum of wavelengths of that color as utilized in the system. Such nominal or central wavelength would represent the dominant wavelength of a primary color impinging on the light modulating medium. As all of the wavelengths in a primary color component are not equally transmitted by the optical elements on the output side of the light modulating medium, the dominant wavelengths of primary colors projected on the screen would be different from the dominant wavelengths of the primary color impinging on the light modulating medium; however, even so such dominant wavelengths are close to the central or nominal wavelengths as defined above. Typically, the nominal wavelengths for the blue color component may be 465 millimicrons and the nominal wavelengths for the red primary color may be 620 millimicrons.

In accordance with the present invention the ratio of the line to line spacing of the blue primary color diffraction grating to the line to line spacing of the red primary color diffraction grating is selected to be substantially equal to the ratio of the nominal wavelength of red light to the nominal wavelength of blue light. For the typical value mentioned above this ratio is equal to 1.33. For other considerations, important in the proper operation of the system and more fully treated in copending patent application Serial No. 366,005, filed May 8, 1964, and assigned to the assignee of the present invention, certain integral relations must exist in the relationship of the carrier frequency producing the red and blue diffraction gratings. The integral relationship 4 to 3 for the red and blue carrier frequencies has been found to be highly advantageous. As the aforementioned ratio of the nominal red wavelength to the nominal blue wavelength is in the ratio 4 to 3, such ratio has been selected for the system of FIGURE 1 in accordance with one aspect of the present invention. Of course, it will be appreciated that the absolute value of the carrier frequencies which determine the line to line spacing of the red and blue gratings are determined by such considerations as the capability of forming fine gratings in the light modulating medium and also by such requirements as that the beat of the carrier frequencies lie outside the video band of frequencies and do not produce an objectionably visible grating pattern.

When the ratio of the line to line spacing of the blue primary grating to the line to line spacing of the red primary gratings is 4 to 3 and the vertical bars of the output mask are positioned to block the various order of blue light diffracted by the red diffraction grating allowing only the red light to come through, first, second, and third order of components of blue light fall on the first, sceond, and third bars 95, 96 and 97, respectively, removed from bar 94 on which zero order light falls, and first order red light falls in the second slot 99 removed from the zero order bar 94 and second order red light falls on the third slot 100 removed from the zero order bar 94.

In FIGURE 9B is shown the distribution of the various orders of red and blue light over the output mask for the blue or shorter wavelength primary component diffraction grating formed in the manner described above. In this figure there is shown the same system of bars and slots, and so designated, as shown in FIGURE 9A. The horizontal coordinate in this case also represents the horizontal displacement of various diffraction orders of the red and blue primary components in relation to the slots and bars in the output mask. As the line to line spacing of the blue grating is greater the various orders of diffracted light are deviated less as determined by the relationship to the line to line spacing of the red diffraction grating to the line to line spacing of the blue diffraction grating. Zero order light $R_0$, $B_0$ is unaffected. First order blue light $B_1$, however, now falls substantially in the first slot 98 removed from the zero order bar, and second order blue light $B_2$, and third order blue light $B_3$ fall, respectively, in the second slot 99 and third slot 100 removed from the zero order bar 94. First order red light $R_1$ and second order red light $R_2$ now fall on the first bar 95 and second bar 96 removed from the zero order bar 94. It should also be noted that fourth order blue light $B_4$, and third order red light $R_3$ fall on the third bar 97 removed from the zero order bar 94. Thus, even though red light in addition to blue light falls on the blue diffraction grating, the system of bars and slots in accordance with the present invention blocks the red light and passes only the blue light. In the system illustrated the first, second, and third orders of blue diffracted by the blue grating are passed and the first and second order of red light diffracted by the red grating are passed. From FIGURES 7 and 8 it will be readily seen that, with such a system in which the maximum modulation of the light modulating medium corresponds to a depth near the depth where maximum efficiency is obtained, that high efficiency is obtained for both the red and blue components of light and good color selection, i.e., purity of the two colors is maintained, as well is obtained. With the use of narrow sources of light made possible by the lenticular lens plate optics of the light input portion of the system of FIGURE 1, as described above, and more fully described in copending patent application Serial No. 316,606, filed October 16, 1963, and assigned to the assignee of the present invention, the slots of the output mask can be made quite wide without comprising purity in the various colors passed yet at the same time permitting a higher proportion of diffracted light to pass than would otherwise be the case. Such increase in the width of an output vertical slot may be as high as 75% of the width of a slot and an adjacent bar.

The appearance of two diffraction gratings of different line to line spacing but having lines similarly oriented in the same area of the light modulating medium gives rise to a third diffraction grating the line to line spacing of which is determined by the difference in the two frequencies which were utilized in forming the corresponding primary gratings. The frequency of the two modulating signals are selected such that the difference frequency is less than the frequency of the other two frequencies. The grating produced by the beating of the other two gratings, as it has a line to line spacing less than the other two gratings, will produce a deviation in the various order of diffracted light which is less than the deviation produced by the other two gratings, the amount of such deviation depending upon the line to line spacings of that grating, and of course the wavelength of light.

FIGURE 9C illustrates the manner in which advantage is taken of the existence of a beat frequency grating in accordance with the present invention to utilize fully the light in the various diffraction orders of that diffraction grating. In this figure the same portion of the central portion of the light output mask is shown with the same bars and slots, and so designated, as appear in FIGURES 9A and 9B. In FIGURE 9C the red and blue light are collectively designated by letter M for magenta, and the various orders are designated by the appropriate numerical symbol. As in the case of FIGURES 9A and 9B zero order magenta $M_0$ falls on the zero order bar 94. First order magenta light $M_1$, second order magenta light $M_2$ and third order magenta light $M_3$ fall in the first slot 98 removed from the zero order bar 94. However, as indicated in the figure at least a portion of the blue light in the first order and a portion of the red light in the third order are blocked. It has been found that such blockages are essentially complementary, and thus the magenta light passing through the first slot is red and blue light in the proportions essentially desired. As can be appreciated from FIGURES 7 and 8, a system which utilizes the second and third order light in addition to the first order light even though some first and third order light is blocked provides an appreciable increase in efficiency over a system which utilizes essentially only the first order light.

In FIGURE 9D is shown a portion of one of the side sections of the output mask in which is included several bars designated 101, 102, 103 and 104 separated by successive slots 105, 106 and 107. The horizontal coordinate represents the vertical displacement of the various orders of green light denoted $G_0$, $G_1$, $G_2$, $G_3$ and $G_4$ in relation to the slots and bars of the output mask 31 of FIGURES 1 and 5. As explained above, the grating associated with the green primary color component is formed by using the horizontal scan lines of a field. The electron beam in its horizontal scan is modulated by a very high frequency carrier wave, for example 48 megacycles to produce a smearing of charge in the vertical direction. Under zero video modulation of the carrier wave the charge is completely smeared over the raster thereby reducing to a minimum any deformations in the modulating medium. The amount of smear is progressively decreased with increasing video signal thereby allowing the appearance of diffraction gratings. The center-to-center spacing of the bars in the output mask for the green channel is three-quarters the center-to-center spacing of the bars in the red and blue channels. Accordingly, in a system such as shown in FIGURE 1 with raster height being 0.82 inch and with a green center wavelength of 530 millimicrons first order green light $G_1$ falls in slot 105, about one-third of second order green light $G_2$ is passed in slot 106, and one-third of third order green light is also passed in slot 106. The slots 105, 106, and 107 are made of sufficient width to obtain good passage of such green light.

While the invention has been described in specific embodiments, it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. A system for simultaneously controlling point by point the intensity of each of a pair of primary color components in a beam of light in response to respective electrical signals comprising:

(a) a light modulating medium, (b) means for directing said beam on said light modulating medium, (c) means for simultaneously producing two sets of deformations in said medium, the deformations in each set being arranged in uniformly spaced similarly directed lines to form respective light diffraction gratings, the lines in each set extending in the same direction, one of said diffraction gratings having a line to line spacing smaller than the other of said gratings, (d) said sets of deformations forming a third diffraction grating of line to line spacing which is uniform and greater than the line to line spacing of either of said other gratings, (e) means for controlling the amplitude of the lines of deformation of said one grating in response to the one of said electrical signals corresponding to the one of said color components of longer wavelengths, (f) means for controlling the amplitude of lines of deformation of the other of said gratings in response to the other of said electrical signals, (g) a light mask positioned in the path of light transmitted from said medium, said mask having at least three transparent portions, each of said portions being successively displaced in position from the path of undeviated light from said medium, (h) the one of said transparent portions adjacent said undeviated path being positioned and of extent in the direction of deviation to pass first order light of said color components diffracted by said third grating and to pass first order light of said other color component diffracted by said other grating, (i) the next adjacent one of said transparent portions being positioned and of extent in the direction of deviation to pass first order light of said one color component diffracted by said one grating and second order light of said other component diffracted by said other grating, (j) the third of said transparent portions being positioned and of extent in the direction of deviation to pass substantially second order light of said one color component diffracted by said one grating.

2. A system for simultaneously controlling point by point the intensity of each of a pair of primary color components in a beam of light in response to respective electrical signals comprising:

(a) a light modulating medium, (b) means for directing said beam on said light modulating medium, (c) means for simultaneously producing two sets of deformations in said medium, the deformations in each set being arranged in uniformly spaced similarly directed lines to form respective light diffraction gratings, the lines in each set extending in the same direction, one of said diffraction gratings having a line to line spacing smaller than the other of said gratings, (d) the line to line spacing of said one grating to the line to line spacing of said other grating being in the relation of the nominal wavelength of said other color component to the nominal wavelength of said one color component, (e) said sets of deformations forming a third diffraction grating of line to line spacing which is uniform and greater than the line to line spacing of either of said other gratings, (f) means for controlling the amplitude of the lines of deformation of said one grating in response to the one of said electrical signals corresponding to the one of said color components of longer wavelengths, (g) means for controlling the amplitude of lines of deformation of the other of said gratings in response to the other of said electrical signals, (h) a light mask positioned in the path of light transmitted from said medium, said mask having at least three transparent portions, each of said portions being successively displaced in position from the path of undeviated light from said medium, (i) the one of said transparent portions adjacent said undeviated path being positioned and of extent in the direction of deviation to pass first order and second order light of said color components diffracted by said third grating and to pass first order light of said other color component diffracted by said other gratings, (j) the next adjacent one of said transparent portions being positioned and of extent in the direction of deviation to pass first order light of said one color component diffracted by said one grating and second order light of said other component diffracted by said other grating, (k) the third of said transparent portions being positioned and of extent in the direction of deviation to pass substantially second order light of said one color component diffracted by said one grating.

3. A system for simultaneously controlling point by point the intensity of each of a pair of primary color components consisting of red and blue in a beam of light in response to respective electrical signals for projecting an image corresponding to said electrical signals comprising:

(a) a light medium deformable into diffraction gratings by electric charges deposited thereon, (b) means for directing a beam of light of said primary color component on said medium, (c) means to direct an electron beam upon said medium to produce such electric charges in said medium, (d) means for deflecting said beam in one direction at successively spaced intervals over said medium to form a raster thereon, (e) means for modulating said beam with an electrical signal of a fixed frequency corresponding to the red component of said image and an amplitude varying in accordance with the point to point intensity of the red component in said image to form a diffraction grating in said medium, (f) means for simultaneously modulating said beam with another signal of another fixed frequency lower than said one fixed frequency corresponding to the blue component of said image and an amplitude varying in accordance with the point to point intensity of said blue component in said image to form in said medium another diffraction grating having lines oriented parallel to the lines of said one grating, (g) said one fixed frequency and said other fixed frequency being in the relation of four to three, (h) said diffraction gratings forming in said medium a third diffraction grating the spacing between adjacent lines of which corresponds to a frequency which is the difference of said fixed frequencies, said difference frequency being less than either of said fixed frequencies, (i) a light mask positioned in the path of light transmitted from said medium, said mask having at least three transparent portions, each of said portions being successively displaced in position from the path of undeviated light from said medium, (j) the one of said transparent portions adjacent said undeviated path being positioned and of extent in the direction of deviation to pass first, second and third order light of said components diffracted by said third grating, and to pass first order light of said blue component diffracted by said other grating, (k) the next adjacent one of said transparent portions being positioned and of extent in the duration of deviation to pass substantially first order light of said red component diffracted by said one grating and second order light of said blue component diffracted by said other grating, (l) the third of said transparent portions being positioned and of extent in the duration of deviation to pass second order light of said red component diffracted by said one grating and third order light of said blue component diffracted by said other grating.

4. A system for simultaneously controlling point by point the intensity of each of a pair of primary color components consisting of red and blue in a beam of light in response to respective electrical signals for projecting an image corresponding to said electrical signal comprising:

(a) a light medium deformable into diffraction gratings by electric charges deposited thereon, (b) means for directing a beam of light of said primary color component on said medium, (c) means to direct an electron beam upon said medium to produce such electric charges in said medium, (d) means for deflecting said beam in one direction at successively spaced intervals over said medium to form a raster thereon, (e) means for modulating said beam with an electrical signal of a fixed frequency corresponding to the red component of said image and an amplitude varying in accordance with the point to point intensity of the red component in said image to form a diffraction grating in said medium, (f) means for simultaneously modulating said beam with another signal of another fixed frequency lower than said one fixed frequency corresponding to the blue component of said image and an amplitude varying in accordance with the point to point intensity of said blue component in said image to form in said medium another diffraction grating having lines oriented parallel to the lines of said one grating, (g) said one fixed frequency and said other fixed frequency being in the relation of four to three, (h) the nominal wavelength of said red color component and the nominal wavelength of said blue color component being in the relation of four to three, (i) said diffraction gratings forming in said medium a third diffraction grating the spacing between adjacent lines of which corresponds to a frequency which is the difference of said fixed frequencies, said difference frequency being less than either of said fixed frequencies, (j) a light mask positioned in the path of light transmitted from said medium, said mask having at least three transparent portions, each of said portions being successively displaced in position from the path of undeviated light from said medium, (k) the one of said transparent portions adjacent said undeviated path being positioned and of extent in the direction of deviation to pass first, second and third order light of said components diffracted by said third grating, and to pass first order light of said blue component diffracted by said other grating, (l) the next adjacent one of said transparent portions being positioned and of extent in the direction of deviation to pass substantially first order light of said red component diffracted by said one grating and second order light of said blue component diffracted by said other grating, (m) the third of said transparent portions being positioned and of extent in the direction of deviation to pass second order light of said red component diffracted by said one grating and third order light diffracted by said other grating.

5. A system for simultaneously controlling point by point the intensity of each of a pair of primary color components consisting of red and blue in a plurality of beams of light in response to respective electrical signals for projecting an image corresponding to said electrical signals comprising:

(a) a light modulating medium, (b) means for directing said beam on said light modulating medium, means for simultaneously producing two sets of deformations in said medium, the deformations in each set being arranged in uniformly spaced similarly directed lines to form respective light diffraction gratings, the lines in each set extending in the same direction, one of said diffraction gratings having a line to line spacing three-fourths of the line to line spacing of the other of said gratings, (c) said sets of gratings forming a third diffraction grating of line to line spacing which is uniform and greater than the line to line spacing of either of said other gratings, (d) means for controlling the amplitude of the lines of deformation of said one grating in response to the one of said electrical signals corresponding to the red component of said image, (e) means for controlling the amplitude of lines of deformation of the other of said gratings in response to the other of said electrical signals, (f) a light mask positioned in the path of light transmitted from said medium, said mask having a plurality of transparent slots of equal width interleaved with a plurality of bars of equal width, each of said slots being successively positioned in a line orthogonal to said lines of deformation, each of said slots being oriented parallel to said lines of deformation, six successive slots forming a set of slots with respect to a beam the undeviated path of which intersects the center bar associated with said set of six slots, (g) the slots of said set adjacent said path being positioned and of lateral extent to pass first, second and third order light of said components diffracted by said third grating and to pass first order light of said blue component diffracted by said other grating, (h) the next adjacent ones of said slots in said set being positioned and of lateral extent to pass substantially first order light of said red component diffracted by said one grating and second order light of said blue component diffracted by said other grating, (i) the remote ones of said slots in said set being positioned and of lateral extent to pass second order light of said red component diffracted by said one grating and third order light of said blue component diffracted by said other grating.

No references cited.

DAVID G. REDINBAUGH, *Primary Examiner.*

J. A. O'BRIEN, *Assistant Examiner.*